United States Patent [19]

Lee

[11] Patent Number: 5,553,801
[45] Date of Patent: Sep. 10, 1996

[54] TAPE TENSION MEASURING DEVICE FOR USE IN A TAPE RECORDER INCLUDING A GUIDE POLE WITH A PIEZOELECTRIC COATING

[75] Inventor: Hyun-Moo Lee, Incheon, Rep. of Korea

[73] Assignee: Daewoo Electronics Co., Ltd., Seoul, Rep. of Korea

[21] Appl. No.: 294,521

[22] Filed: Aug. 23, 1994

[30] Foreign Application Priority Data

Aug. 24, 1993 [KR]  Rep. of Korea ...................... 93-16479

[51] Int. Cl.⁶ .................................................... G11B 15/43
[52] U.S. Cl. .................. 242/357; 242/334.6; 242/615.4; 226/190; 226/196
[58] Field of Search .............................. 242/334, 334.6, 242/357, 413, 413.4, 413.5, 548, 548.3, 615, 615.4; 226/10, 24, 25, 100, 190, 195, 196

[56] References Cited

U.S. PATENT DOCUMENTS

| | | | |
|---|---|---|---|
| 4,573,619 | 3/1986 | Grant | 242/615 |
| 5,206,771 | 4/1993 | Katou et al | 242/349 |
| 5,425,487 | 6/1995 | Saito et al. | 242/615.3 |

FOREIGN PATENT DOCUMENTS

| | | | |
|---|---|---|---|
| 56-163552 | 12/1981 | Japan | 242/334.6 |
| 568075 | 8/1977 | U.S.S.R. | 242/615 |
| 590819 | 2/1978 | U.S.S.R. | 226/196 |
| 624284 | 9/1978 | U.S.S.R. | 226/196 |

*Primary Examiner*—John P Darling
*Attorney, Agent, or Firm*—Anderson Kill Olick & Oshinsky, P.C.

[57] ABSTRACT

A device for measuring tape tension for use in a tape recorder utilizes a guide pole having an external surface portion thereof coated with a piezoelectric material to detect the tape tension.

4 Claims, 2 Drawing Sheets

5,553,801

TAPE TENSION MEASURING DEVICE FOR USE IN A TAPE RECORDER INCLUDING A GUIDE POLE WITH A PIEZOELECTRIC COATING

FIELD OF THE INVENTION

The present invention is directed to a device for measuring tape tension for use in a tape recorder; and, more particularly, to a simplified device which utilizes a guide pole coated with a piezoelectric material to detect the tension of the tape running along a path defined by guide members within the tape recorder.

DESCRIPTION OF THE PRIOR ART

Generally, in a tape recorder utilizing a magnetic tape for recording/reproducing audio/video signals, it is preferable that the tension of the tape running between the take-up reel and the supply reel be maintained in a desired tape tension profile. Accordingly, a tape tension measuring device has been used in order to appropriately control the tape running mechanism.

One of such tape tension measuring devices is disclosed in Japanese Utility Model Laid-Open Publication No. 86-174041, which utilizes a detecting roller wherein one end thereof is supported by a plate spring through an arm member, said plate spring being equipped with a pair of strain gauges for measuring the strain exerted on the spring surface.

In Japanese Utility Model Laid-Open Publication No. 89-116935, there exists another type of tension measuring device employing a plurality of contact bars which are arranged at a right angle to the direction of the tape transport, each bar being capable of moving in the direction perpendicular to the tape surface. Said contact bar tends to bend a plate spring correspondingly to the biasing force of the running tape, which allows the strains upon the plate spring converted into measurable tension values in proportion to the degree of bending.

While the above and other prior art tape tension measuring devices are capable of performing their assigned task, since they are structured to have numerous components, needs have continued to exist for a tape tension measuring device having fewer components and less space requirements, lower manufacturing costs and reduced possibility of malfunctioning.

SUMMARY OF THE INVENTION

It is, therefore, a primary object of the invention to provide a tape tension measuring device which is capable of reducing the number of components to thereby economize the manufacturing cost and space requirement thereof.

The above and other objects of the present invention are accomplished by providing a device for measuring a tape tension for use in a tape recorder, which comprises: a guide pole, coated with a layer of a piezoelectric material which comes into direct contact with the tape, said piezoelectric layer adapted to produce an electrical signal as the tape is biased thereagainst; an amplifier for amplifying the electrical signal; an A/D converter for converting said amplified electrical signal into a digital signal; means for sampling the digital signal and obtaining an average value of the signal samples; and means for determining the tape tension by using the average value.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
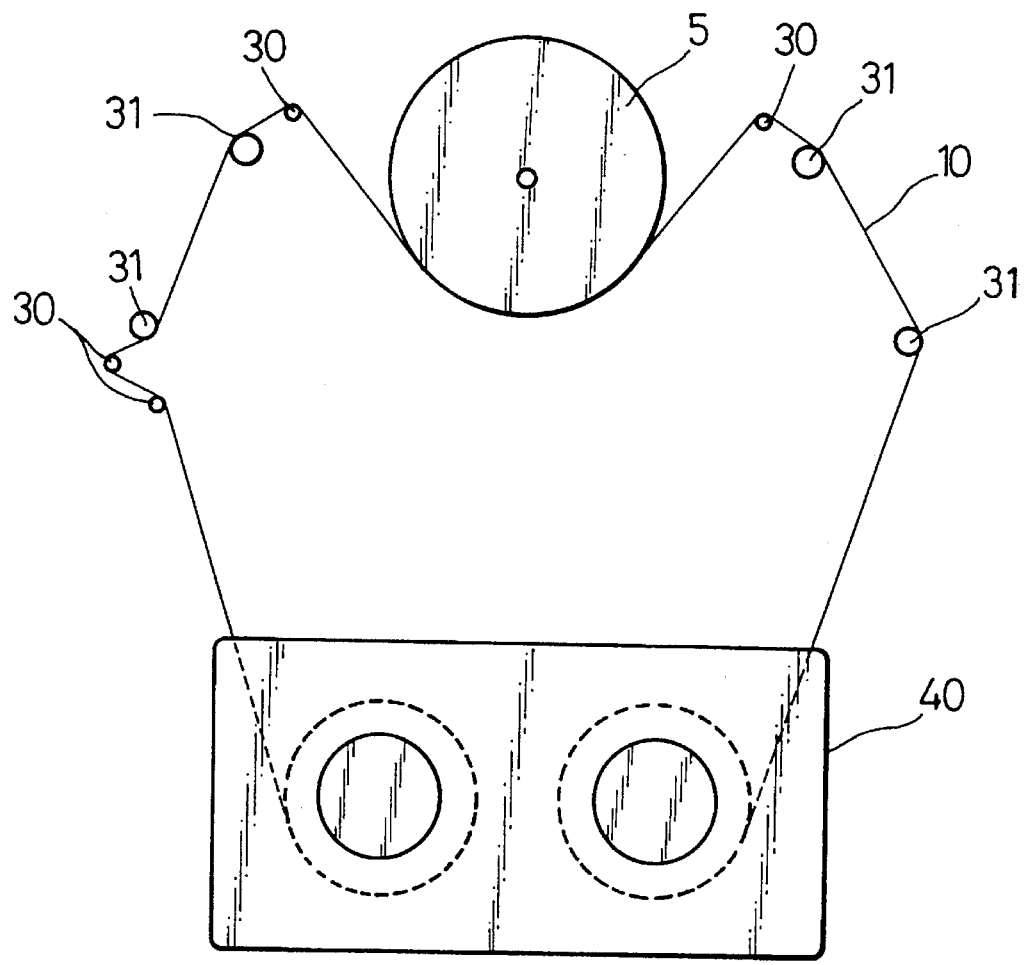
FIG. 1 is a schematic plan view of a typical videotape cassette and some of the operating components of a tape recorder, with the tape running along a head drum.

Referring to FIG. 1, wherein there is shown a magnetic tape 10 which is extracted from a videotape cassette 40 and positioned along a moving path defined by a plurality of tape guide members 30 and 31, being in contact with a head drum 5 when the cassette 40 is loaded into a video cassette recorder. Said guide members 30 and 31 secured on a deck(not shown) are generally grouped into the guide rollers 31 which make a rolling contact with the tape 10; and the guide poles 30 which make a sliding contact therewith.

Figure 2:
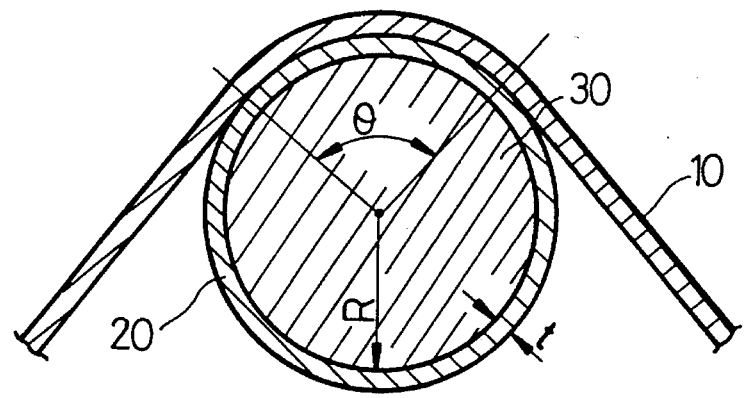
FIG. 2 represents an enlarged cross sectional view of a guide pole coated with a piezoelectric material layer, which is in direct contact with the tape.
Figure 3:
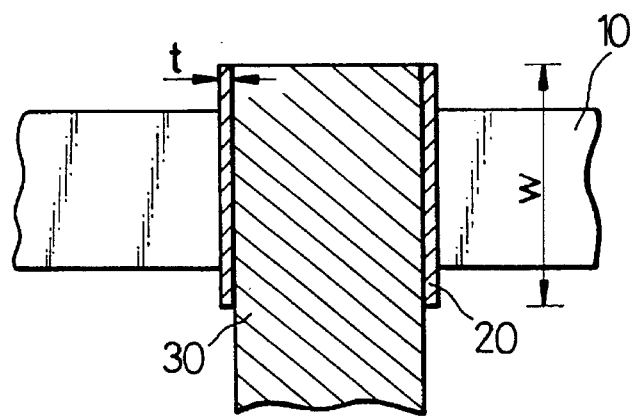
FIG. 3 illustrates a side sectional view of the guide pole shown in FIG. 2.

In FIGS. 2 and 3, there are shown one of the guide poles 30, in enlargement, coated with a piezoelectric material layer 20 with the magnetic tape 10 directly contacting the surface of the layer 20. The guide pole 30 covered with the piezoelectric material 20 constitutes a key component of the inventive tape tension measuring device, wherein said piezoelectric material 20 is of a semiconductor material having a piezoelectric effect even as a thin film, e.g., lead zirconium titanate, barium titanate or lead titanate, which is capable of generating a corresponding electric charge when a mechanical force or stress is exerted thereon. Accordingly, said piezoelectric material 20 covering the guide pole 30 is adapted to generate an electrical signal, i.e., a variation in the electric current, whenever biasing force from the running tape 10 is exerted thereon.

Although the entire circumference of the guide pole 30 is shown to be coated with said material 20 in FIGS. 2 and 3, the coating of the piezoelectric material layer 20 may be partially done on the surface of the guide pole 30 where the tape 10 comes into direct contact. However, the width of the piezoelectric material layer 20 is preferably larger than that of the tape 10 so that there exists a sufficient contact maintained between the tape 10 and the piezoelectric material layer 20.

Further, the thickness of the piezoelectric material layer 20 coated on the guide pole 30 preferably ranges from 0.5 µm to 10 µm, more preferably from 1 µm to 6 µm, and, most preferably, from 2 µm to 4 µm.

Figure 4:
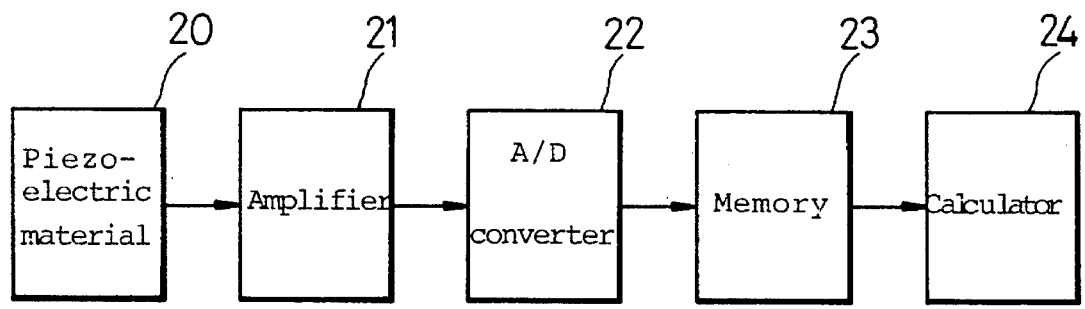
FIG. 4 offers a block diagram of the major functional elements constituting the inventive tape tension measuring device.

Referring now to FIG. 4, an amplifier 21 receives an electric signal from the piezoelectric material 20 and outputs an amplified electrical signal to an A/D converter 22. The converter 22 converts the amplified electrical signal into a digital signal.

Said digital signal, fluctuating over time, is sampled at regular time intervals at a memory 23. The memory 23 further computes an average value of said signal samples.

A calculator 24 then computes the tape tension by substituting the average value of the signal samples in accordance with the following equation:

$$T = \mu P R \Theta + T_0$$

wherein T is the tape tension value, μ is a friction factor between the tape 10 and the piezoelectric material layer 20, P represents the average value obtained from memory 23 although it normally represents the biasing force of the tape against the piezoelectric layer 20, R is the radius of the guide pole 30 coated with the piezoelectric material 20, Θ is the contact angle of the piezoelectric material layer 20 with the tape 10, and $T_0$ represents the initial tape tension value, which can be empirically obtained.

As well known in the art, the above-described functions of the memory 23 and the calculator 24 may be collectively carried out in a conventional microprocessor. On the other hand, the tape tension value detected through the inventive tape tension measuring device can be utilized as an input to a servo controller(not shown) adapted to control the tension pole(not shown) or reel drive clutch(not shown) of the tape running mechanism employed in the recorder.

Although the invention has been shown and described with respect to the preferred embodiments, it will be understood by those skilled in the art that various changes and modifications may be made without departing from the spirit and scope of the invention as defined in the following claims.

What is claimed is:

1. A device for measuring tape tension for use in a tape recorder, which comprises:

a guide pole, at least an external portion thereof being coated with a layer of a piezoelectric material, wherein said piezoelectric material layer is adapted to produce an electrical signal as the tape is biased thereagainst; and means for processing the electrical signal to calculate the tape tension.

2. The device as recited in claim 1, wherein said processing means includes:

an amplifier for amplifying the electrical signal;

an A/D converter for converting said amplified electrical signal into a digital signal;

means for sampling the digital signal and obtaining an average value of the signal samples; and means for determining the tape tension by using the average value.

3. A video cassette recorder having a device for measuring the tension of a tape loaded therein, said device comprising:

a guide pole, at least an external portion thereof being coated with a layer of a piezoelectric material, wherein said piezoelectric material layer is adapted to produce an electrical signal as the tape is biased thereagainst; and means for processing the electrical signal to calculate the tape tension.

4. The recorder as recited in claim 3, wherein said processing means includes:

an amplifier for amplifying the electrical signal;

an A/D converter for converting said amplified electrical signal into a digital signal;

means for sampling the digital signal and obtaining an average value of the signal samples; and means for determining the tape tension by using the average value.

* * * * *